Oct. 15, 1946. W. H. HUNTER 2,409,433
DUCT THROTTLE
Filed Sept. 10, 1943 2 Sheets-Sheet 1
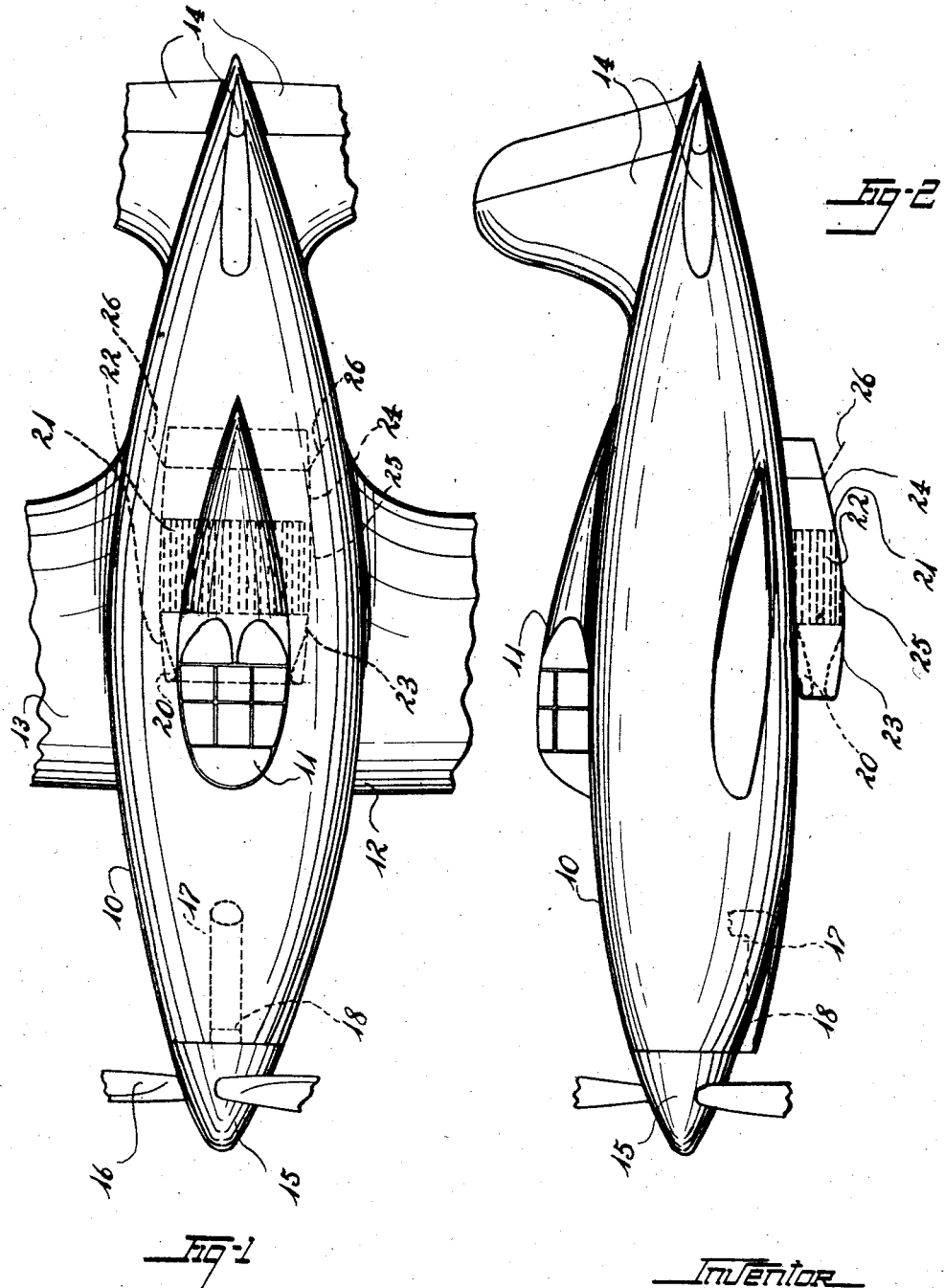

Oct. 15, 1946.   W. H. HUNTER   2,409,433
DUCT THROTTLE
Filed Sept. 10, 1943   2 Sheets-Sheet 2
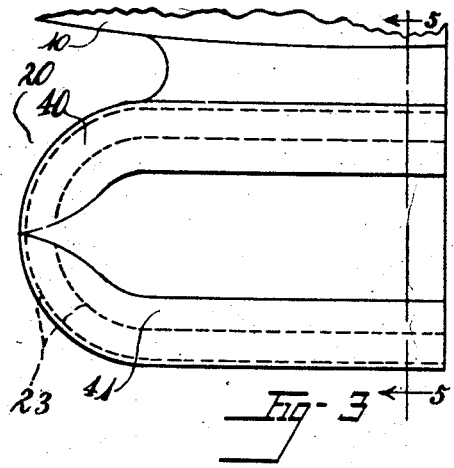
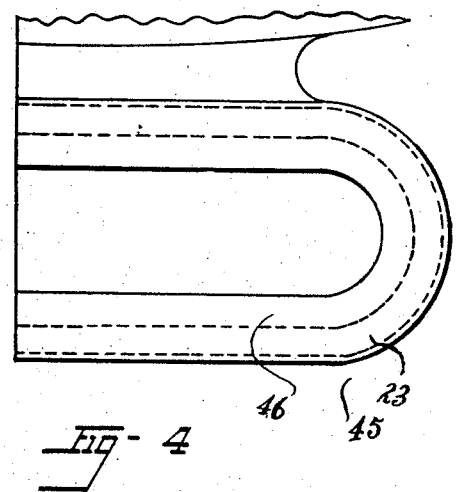
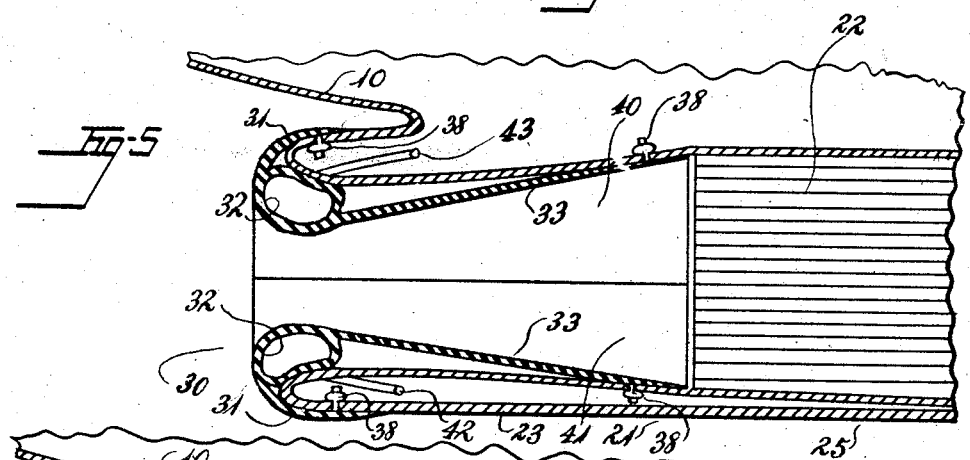
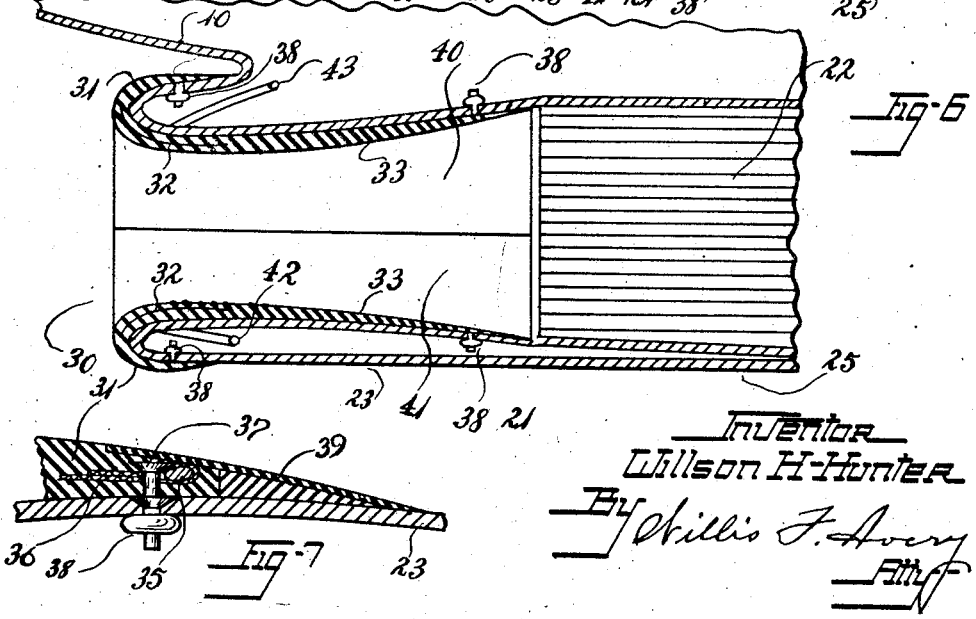
Inventor
Willson H. Hunter Patented Oct. 15, 1946

2,409,433

UNITED STATES PATENT OFFICE 2,409,433

DUCT THROTTLE

Willson H. Hunter, Akron, Ohio, assignor to The B. F. Goodrich Company, New York, N. Y., a corporation of New York Application September 10, 1943, Serial No. 501,785

8 Claims. (Cl. 138—45)

This invention relates to closure apparatus for the end of a passage and especially to apparatus for throttling flow at the intake end of a duct for fluids.

The invention is applicable especially to the ends of conduits for closing, wholly or partially, such ends while maintaining desirable flow conditions in and around the conduits despite the throttling action. It is useful especially in aircraft in connection with air intakes for ventilation and for the engine cooling and fuel supply systems, including radiator ducts, which heretofore usually have had mechanical devices such as flaps for controlling the flow of fluid therethrough. Such expedients as flaps have not been aerodynamically efficient nor wholly satisfactory, especially when mounted at the intake end of a duct, because of the resulting turbulent flow through the duct at the region of the intake end. Also, the flow past the outside surface of the duct has been adversely affected, and icing has been a problem.

Prior expedients such as flaps at the intake end portion of the radiator duct have not been satisfactory owing to turbulent flow of air through and around the outside of the duct, especially at high speeds. A contributing factor to this difficulty has been the inability of the frontal surface to serve aerodynamically in the best manner and especially to accommodate shifting positions of the stagnation point of the airflow.

Principal objects of the invention are to provide an inflatable throttle for an end of a passage, to provide for controllably altering the area and the contour of an end of a conduit immediately at said end, to provide for throttling the flow of fluid through the intake end of the conduit while promoting smooth flow around the outside of and through the conduit at the end, and to provide simplicity of construction, convenience of manufacture, and effectiveness of operation.

Further objects are to provide for reducing the aerodynamic losses at the intake end of a duct in an aircraft structure, to provide for an effective diffusion zone within the duct adjacent the intake end for minimizing turbulent flow of fluid therein, to provide for effectively throttling the fluid flowing through the duct while at the same time maintaining the desired flow conditions at the entrance to and around and in the duct, and to provide effectively for preventing ice accumulation at the intake end of the duct.

These and other objects and advantages will be apparent from the following description.

In the accompanying drawings, which form a part of this specification, and in which like numerals are employed to designate like parts throughout the same, Fig. 1 is a plan view from above of an aircraft provided with apparatus for throttling the flow of air through the intake ends of ducts, the apparatus being constructed in accordance with and embodying the invention, parts being broken away, Fig. 2 is a side elevation of the aircraft, Fig. 3 is a front view of a duct shown in Fig. 1, parts being broken away, Fig. 4 is a view like Fig. 3 but showing a modified construction of the apparatus, parts being broken away, Fig. 5 is a longitudinal section of the radiator duct of Fig. 1, the inflatable throttle being shown in an inflated condition, parts being broken away, Fig. 6 is a view like Fig. 5 but showing the throttle in a deflated condition, and Fig. 7 is a sectional view on an enlarged scale showing the attachment of a margin of the apparatus to a wall of the duct.

In the drawings, with reference first to Figs. 1 and 2, the invention is applied to an aircraft structure comprising a fuselage 10 having an enclosed compartment 11 for the pilot, a pair of wings 12 and 13, an empennage 14, a spinner 15 and a propeller 16 rotatively driven by an engine unit disposed within the fuselage.

An air intake duct 17 for the carburetor of the engine fuel supply system is mounted adjacent the engine within the fuselage 10, and includes an intake end portion 18 of the duct adjacent the spinner 15 projecting from the bottom surface of the fuselage 10 in a manner to receive air frontally. Other locations for the intake end portion 18 such as at the leading edges of the wings 12 and 13 or the sides or top surfaces of the fuselage 10 may be utilized, if desired.

For cooling the engine of the aircraft, a duct 21 including a radiator 22 is mounted on the bottom surface of the fuselage 10, as shown in Figs. 1 and 2, the radiator 22 being interconnected by suitable fluid conduits (not shown) with the engine. Other locations on the aircraft such, for example, as the leading edges of the wings may be used for disposition of the radiator duct, if desired.

The throttling apparatus of the invention may be substantially the same in construction and operation whether it be for the radiator duct, or the ventilating duct. Accordingly, it need be described in detail with reference to only one of these applications and the application to the radiator duct is chosen for illustrative description.

The radiator duct 21 comprises an intake end portion 23, an exit end portion 24, and an intermediate portion 25 accommodating the radiator 22 therein. In case it is desired that the areas of the intake and exhaust ends be simultaneously varied in extent in throttling the flow of cooling air through the radiator duct in accordance with the requirements of the engine, the radiator duct arrangement 21, as shown especially in Figs. 1 and 2, may be provided. Apparatus 20 is provided at the intake end of the portion 23 for throttling the flow of air therethrough and pivotally mounted exit flaps 26 are provided at the exit end of the portion 24 for controlling the flow of air.

The apparatus 20 comprises a covering 30 including elastic material such, for example, as resilient rubber or other rubber-like material disposed preferably throughout the perimeter of and immediately at the intake end of the portion 23 in the manner shown especially in Figs. 3, 5, 6 and 7. The covering 30 includes an inflatable tube or chamber 32 disposed at the intake end of the duct portion 23 for advancing the surface of the covering immediately at said end across the duct toward the opposite inner wall, and a portion 31 extending from the inflatable tube 32 along the outer wall of the duct portion 23, the portion 31 being attached at its margin to the outer wall. The tube 32 may or may not be provided with a fabric reinforcement to promote uniformity of shape during inflation. The covering 30 also includes a trailing portion 33 disposed at the inner wall of the intake end portion 23 and extending into the duct from the inflatable tube 32 along the inner wall and terminating at or in advance of the front wall of the radiator 22 for providing a rearwardly flared diffusing zone of substantial extent within the duct, when the tube 32 is in an inflated condition, as shown especially in Fig. 5, to promote smooth flow of air through the duct portion 23. The trailing portion 33 is attached at its margin to the inner wall. The throttling apparatus 20 is inflatable to various amounts of intake opening and the arrangement is such that under all conditions of inflation a rounded frontal surface is presented which frontal surface may be accommodated to changing conditions of speed and shifting positions of the stagnation point while maintaining good aerodynamic flow over such frontal surface and through the duct and around the outside of same under these changing conditions.

The covering 30 is mounted at the intake end in a condition of tension between its attaching margins, which margins may be attached to the inner and outer walls of the duct as shown especially in Fig. 7. Since both margins may be attached in like manner, the attachment of only the margin at the outer wall need be described. The margin is reinforced by means of a metal bead or wire 35, which may be flat or oval or other suitable shape, preferably enclosed in a strip of fabric 36, all embedded in the rubber material of the covering 30 and the margin is secured to the outer wall of the duct portion 23 by means of screws 37 extending through such strip and into hollow threaded rivets 38 in the outer wall. The wire 35 is adapted to bear against the screws 37 for maintaining the desired tension in the covering 30. The margin tapers beyond the wire 35 to a thin edge and a cover strip 39 is positioned over the screws 37 and extends to the edge of the margin for facilitating smooth flow of air thereover. The margins may also be adhered to the inner and outer walls by a suitable adhesive such, for example, as rubber cement. All fabric and rubber parts of the covering 30 are united preferably by vulcanization.

For wholly enclosing the intake end of the duct, the covering is provided preferably in the form of an upper structure 40 and a lower structure 41, each structure including an inflatable tube 32 as an independent unit which tubes may be connected as by flexible conduits 42 and 43 with a suitable source of fluid under pressure for inflating the tubes.

If the conduits 42 and 43 are joined together the upper and lower tubes 32 may be inflated substantially simultaneously and to a like extent. However, for inflating the upper and lower tubes independently of one another, the conduits 42 and 43 may be separately connected to the source of fluid pressure, which arrangement facilitates flexibility of control in varying the area and contour of the intake end of the duct at the will of the operator.

In the operation of the throttling apparatus 20 under the condition of low speed of the aircraft and with the tubes 32 of the covering 30 in a deflated condition as shown especially in Fig. 6, and with the exit flaps 26 of the duct 21 in the open position, the air meeting the frontal surface flows about and through the intake end of the duct, part of the airflow passes over the surfaces of the portions 31 and about the exterior of the duct while the other part of the airflow passes through the intake end over the surfaces of the inflatable tubes 32 and the trailing portions 33. The apparatus promotes smooth passage of all this airflow. The air within the duct passes through the radiator absorbing heat from the radiator during such passage and discharges from the exit end portion 24 into the ambient airstream.

Under high aircraft speeds, it is desirable that the frontal surface at the intake end of the duct be such as to be adapted aerodynamically to the changed conditions, especially in the respect of becoming suited to a relative shifting of the stagnation zone, so that objectionable turbulence will not develop despite such shifting. To this end the tubes 32 are inflated to advance the surfaces of the covering 30 immediately at the intake end of the upper 40 and lower 41 structures across the intake end toward the opposite inner wall to reduce the area of the duct portion 23 immediately at said end. When the tubes 32 are inflated, as shown especially in Fig. 5, the portions 31 are stretched and moved relative to the wall of the intake end, these portions 31 presenting surfaces in continuation of the curved surfaces of the inflatable tubes 32 to the airflow for promoting smooth flow of air about the outside of and the end of the intake end portion 23.

Coincidental with the inflation of the tubes 32 and movement of the portions 31, the trailing portions 33 are also stretched and flexed away from the inner wall of the duct thereby defining an inwardly flared diffusing zone of substantial extent rearwardly along and within the intake end portion 23 of the duct thus promoting smooth flow of air within the duct. Such an arrangement facilitates smooth flow of air about the outside and through the intake end of the duct 23 despite the shifting of the stagnation zone due to the relatively high speed of the airflow by virtue of the curved frontal surfaces of the covering 30 as presented by the inflatable tubes 32 and the portions 31 and by virtue of the diffusing zone within the duct portion 23 extending from the most constricted portion of the throttle to substantially the front wall of the radiator 22.

A further advantage of the throttling apparatus 20 is that of preventing the accumulation of ice at the intake end of the duct through inflation and deflation of the tubes 32 to break ice formations into pieces for removal by the flow of air.

For some applications the modified construction shown in Fig. 4 may be desirable. Such a construction comprises a continuously annular covering 45 substantially like the covering 30 but including a single inflatable tube 46 extending continuously throughout the perimeter of the intake end of the duct. Upon inflation of the tube 46, which in this case may be effected through a single conduit, the area of the intake end may be reduced substantially uniformly in extent throughout the perimeter of and immediately at the intake end while promoting smooth flow of air around the outside of and through the intake end of the duct in the manner described hereinabove.

Variations may be made without departing from the scope of the invention as defined in the following claims.

I claim:

1. Apparatus for throttling the flow of air through the intake end of a duct for an aircraft structure, said apparatus comprising a covering including a frontal portion positionable about said end and a trailing portion for the wall of said duct at said end, and trailing portion extending into said duct along an inner wall of the duct, and inflatable means for advancing the surface of said covering immediately at said end and along said trailing portion toward an opposite inner wall of said duct in a manner to effect said throttling of flow of air through said duct at said end and said means being effective for altering the contour of said frontal portion while maintaining a desired aerodynamic contour of said frontal and trailing portions to promote smooth flow of air around the outside of and through said duct at said intake end.

2. Apparatus for throttling the flow of air through the intake end of a duct, said apparatus comprising a covering for the wall of said duct at said end, said covering comprising a frontal portion positionable about said end and having a margin for attachment to the outer wall of said duct and an inflatable tube at the inner wall of the duct at said end advancing the surface of said covering immediately at said end across said duct toward an opposite inner wall of the latter for reducing the area of said duct immediately at said end to effect said throttling of flow of air while presenting a generally curved frontal surface at said end to promote smooth flow of air around the outside of and through the duct at said end.

3. Apparatus for throttling the flow of air through the intake end of a duct, said apparatus comprising a covering including resilient rubber-like material for disposition throughout the perimeter of and about said end of the duct, said covering comprising a frontal portion for attachment to the outer wall of said duct, a trailing portion for disposition along the inner wall of said duct and having a rear margin for attachment to the latter said wall, and an inflatable tube between said portions for advancing the surface of said covering immediately at said end across said duct toward an opposite inner wall of the latter for reducing the area of said duct immediately at said end to effect said throttling of flow of air while presenting a curved surface at said end to promote smooth flow of air around the outside of and through said duct at said end and while flexing said trailing portion away from the first said inner wall toward said opposite inner wall for defining an inwardly flared diffusing zone within said duct to promote smooth flow of air through the duct.

4. In a duct assembly for aircraft, in combination, a duct having an intake end exposed to the outer air and an elastic covering disposed at said end for throttling the flow of air through said duct, said covering comprising a frontal portion about said end and attached at a margin thereof to the outer wall of said duct, a trailing portion extending along the inner wall of the duct and attached at the rear margin thereof to the latter said wall, and an inflatable tube between said portions for advancing the surface of said covering immediately at said end across said duct toward an opposite inner wall of the latter for reducing the area of said duct immediately at said end to effect said throttling of flow of air and for altering the contour of said frontal portion while maintaining the desired aerodynamic contour of said portions to promote smooth flow of air around the outside of and through said duct.

5. Closure apparatus for the end of a walled conduit for fluid, said apparatus comprising a covering for extending about said end and including marginal portions for attachment to the inner and outer walls of said conduit, and inflatable means for advancing the surface of said covering immediately at said end toward an opposite inner wall of said conduit in a manner to effect throttling of flow of fluid through said conduit at said end.

6. Closure apparatus for the end of a walled conduit for fluid, said apparatus comprising a covering for an inner wall of said conduit at said end, and inflatable means for advancing the surface of said covering immediately at said end toward an opposite inner wall of said conduit in a manner to effect throttling of flow of fluid through said conduit at said end, said covering including a flexible covering portion extending from said inflatable means into the conduit along the first said inner wall, said portion being flexed in graduated degree by virtue of the inflation of said means away from the adjacent first said inner wall toward said opposite inner wall for promoting smooth flow of fluid through the conduit at said end.

7. Closure apparatus for the end of a walled conduit for fluid, said apparatus comprising a covering for an inner wall of said conduit at said end, and an inflatable chamber at said end in a position for inflation thereof in a direction across said conduit for advancing the surface of said covering immediately at said end toward an opposite inner wall of said conduit to effect throttling of flow of fluid through said conduit at said end, said covering including a flexible covering portion extending from said inflatable chamber into said conduit along the first said inner wall and terminating at a margin for attaching said covering to the first said inner wall of the conduit, said portion being flexed by virtue of said inflation of said chamber away from the adjacent first said inner wall toward said opposite inner wall a gradually decreasing extent toward said margin for promoting smooth flow through the conduit at said end.

8. In a duct assembly for aircraft, in combination, a duct having an intake end facing generally in a direction of flow of air, a covering attached to the wall of said duct at said end, and an inflatable passage in said covering beneath the outer surface thereof at said end, at least a part of said covering extending beyond said passage within said duct along an inner wall of the duct at said end in movable relation to said inner wall, said inflatable passage being constructed and arranged to advance said surface of said covering immediately at said end across the duct toward an opposite inner wall of the latter in a manner to reduce the area of said duct immediately at said end, under inflation, for effecting throttling of flow of air through said duct at said end, said part of said covering being moved across said duct away from said inner wall toward said opposite inner wall at a zone closely adjacent said inflatable passage by virtue of said inflation of the passage providing a continuous outer surface in continuation of the outer surface overlying said passage to promote smooth flow of air through the duct at said end.

WILLSON H. HUNTER.